Patented Jan. 17, 1950

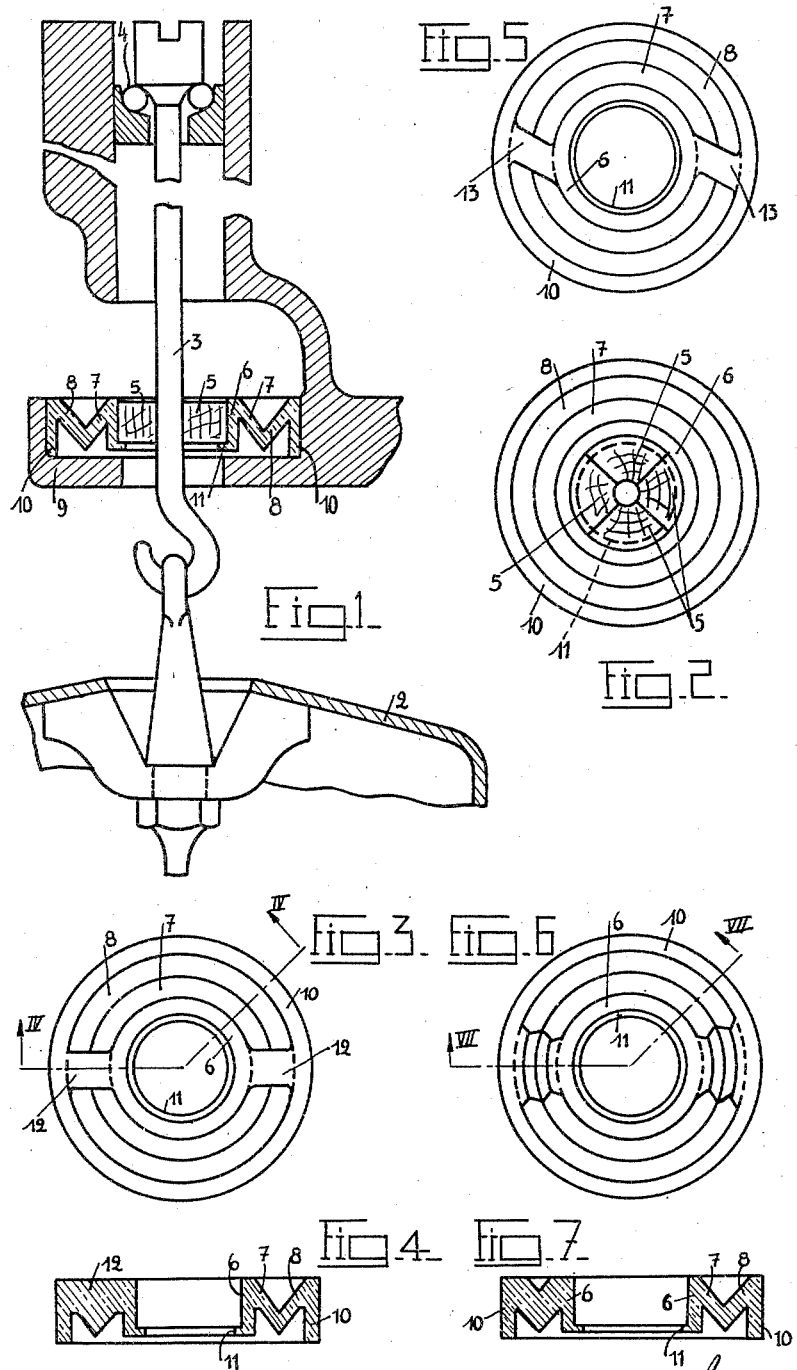

2,494,815

UNITED STATES PATENT OFFICE 2,494,815

ELASTIC GUIDE FOR THE SUSPENSION SHAFT OF THE BOWL OF A CREAM SEPARATOR

Edmond Leon Jean Jadoul, Brussels, Belgium

Application December 14, 1945, Serial No. 635,069
In Belgium December 22, 1944

5 Claims. (Cl. 308—26)

The present invention relates to an elastic guide for the suspension shaft of the bowl of a cream separator in which this shaft is in contact with a rigid bearing surrounded with an elastic rubber cushion acting against the lateral displacements, if any, of the shaft.

Devices of this nature have previously been proposed to limit to an admissible value the lateral deviations of the shaft, in the event of the bowl being unbalanced, because it seemed to offer advantages with regard to other known devices which used springs, ropes and cables. However, prior devices presented the drawback that the oil, which is indispensable for the lubrication of the shaft in the aforesaid rigid bearing, runs over the natural rubber that constitutes the elastic cushion, and within a very short space of time damages this rubber in such a way that the elastic reaction thereof no longer has the necessary value to ensure the normal working of the cream separator.

The present invention has the object of removing this drawback.

To that effect, no effort is made to prevent the oil from reaching the aforesaid elastic cushion, but to make this cushion from synthetic rubber, i. e. from a synthetic resin having an elasticity comparable to that which a natural rubber presents in the case in point, but which does not present the serious drawback of altering characteristics during employment in consequence of its contact with the lubricating oil.

Another object of the invention resides in the particular form given to this synthetic rubber cushion in order to favor its elasticity.

According to the invention, the synthetic rubber cushion is formed by an elastic ring cast with at least one conical wall that surrounds it and which has the same axis as that of the ring, said conical wall being mounted in a casing by the medium of an exterior ring.

According to an advantageous embodiment, the aforesaid ring is surrounded with two coaxial conical walls, cast with it, but the generatrices thereof are inclined in opposite directions with respect to the others and with regard to the axis.

Particularly, the two conical walls are disposed in such a way that a section, by a diametrical plan through them and the two rings between which they are placed, appears M-shaped.

Other details of the invention will appear in the course of the description of the accompanying drawings, which represent, diagrammatically and only by way of example, some embodiments of an elastic guide according to the invention.

Figure 1 represents in vertical sectional the upper part of the bowl of a cream separator hanging from a bar mounted in an elastic guide according to the invention.

Figure 2 is a plan view of this guide.

Figure 3 is a plan view of another guide according to the invention.

Figure 4 is a sectional view taken on the line IV—IV of Figure 3.

Figures 5 and 6 are plan views of two other modifications of the elastic guide according to the invention.

Figure 7 is a sectional view taken on the line VII—VII of Figure 6.

In these different figures, the same reference characters indicate like parts.

In Figures 1 and 2, there has been represented part of a bowl of a cream separator 2 hanging from a shaft 3 running on ball bearings 4. This shaft is guided in a rigid bearing constituted by a plurality of wooden members 5 which will stand wear and tear and do not become deformed. In Figure 2 it is shown that these members are four in number. They are placed in an inner elastic ring 6 constituted of synthetic rubber. This ring is cast with two conical walls having the same axis as itself. The generatrices of these walls are inclined in opposite directions with respect to each other and with regard to the aforesaid axis. These conical walls are designated by 7 and 8.

The conical wall 8 is mounted in a casing 9 by the medium of an exterior ring 10. The inner ring 6, the conical walls 7 and 8 and the exterior ring 10 are cast in one piece.

The cylindrical ring 6 is elastic and allows the members 5 of the bearing to open according to the circle prescribed upon rotation by shaft 3 under the influence of the lack of balance of the bowl 2. During their displacements, the members 5 rest on an inner edge 11 of the interior ring 6.

The conical walls 7 and 8 are disposed in such a way that a section through them and the two rings 6 and 10 between which they are placed, presents a radial section in the shape of an M. This embodiment has shown itself to be very advantageous because it permits easy deformations of the cylindrical ring 6.

The elastic cushion so formed is very supple and permits obtaining a very gentle reaction on the suspension shaft 3 of the bowl during the rotation of this shaft.

If the bowl is not perfectly balanced, it vibrates during its rotation and the vibrations transmit themselves to the suspension shaft, to the members 5 of the bearing, and then to the elastic guide. This latter acts against the lateral displacements of the shaft, and does so the more energetically as the lateral thrust of the shaft is stronger. Nevertheless, the vibrations remain synchronised because all the points of the guide offer a uniform resistance to the lateral displacement of the shaft.

To obtain a better reaction of the elastic guide and to counteract the synchronism of the vibrations, it is desirable to provide, at least at one place of the guide, a point of greater resistance.

The guide of Figures 3 and 4 presents two points of greater resistance constituted by radial ribs 12.

In Figure 5, there is represented a guide in which the points of greater resistance are constituted by ribs 13, which are a little inclined in regard to a radial plane.

It will be understood that similar points of greater resistance can be obtained otherwise than by ribs extending between the conical walls 7 and 8 over the whole height of these latter.

In Figures 6 and 7, there has been represented a guide according to the invention presenting two points of resistance constituted by a simple extra thickness of the material between the two rings 6 and 10.

It is obvious that the invention is not exclusively limited to the represented embodiments and that various changes may be made in the shape, the arrangement and the constitution of certain of the members which are instrumental in accomplishing the embodiment of same, provided such modifications are not in contradiction with the object of each of the following claims.

It goes without saying, for instance, that the number of conical walls between the interior ring 6 and the exterior ring 10 may be optional and that in principle these walls must not necessarily be disposed in such a way that they form an M with the two rings which they connect.

What I claim is:

1. An elastic guide for the suspension shaft of the bowl of a cream separator comprising in combination at least two elements of a hard material in contact with said shaft and forming a lining therefor, an elastic ring encircling said lining and having a radial section in the form of an M, said elastic ring having a flexibility such that it can be deformed radially under the pressure of the elements of hard material when they are pushed back by centrifugal force which is exercised upon the rotation of said shaft in case of disequilibrium thereof, portions of said elastic ring having a greater resistance to radial deformation than other portions of the same ring and a fixed case surrounding said ring.

2. An elastic guide for the suspension shaft of the bowl of a cream separator comprising in combination at least two elements of a hard material in contact with said shaft and forming a lining therefor, an elastic ring surrounding said lining and having a radial section in the form of an M, said elastic ring having a flexibility such that it can be deformed radially under the pressure of the elements of hard material when they are pushed back by centrifugal force, which is exercised upon the rotation of said shaft in case of disequilibrium thereof, portions between the vertical arms of the M shaped radial section being stronger in certain places of said elastic ring than in others, and a fixed casing surrounding said elastic ring.

3. An elastic guide for the suspension shaft of the bowl of a cream separator comprising in combination at least two elements of a hard material in contact with said shaft and forming a lining therefor, an elastic ring surrounding said lining and having a radial section in the form of an M, the said elastic ring having a flexibility such that it can be deformed radially under the pressure of said elements of hard material when they are pushed back by centrifugal force which is exercised upon the shaft in rotation in case of disequilibrium thereof, rib members interposed between the vertical arms of said M shaped ring at predetermined positions therein and a fixed casing surrounding said elastic ring.

4. An elastic guide for the suspension shaft of the bowl of a cream separator comprising in combination at least two elements of a hard material in contact with said shaft and forming a lining therefor, an elastic ring surrounding said lining and having a radial section in the form of an M, said elastic ring having a flexibility such that it may be deformed radially under the pressure of said elements of hard material when they are pushed back by centrifugal force which is exercised upon the shaft in rotation in case of disequilibrium thereof, radial rib members between the vertical arms of said M shaped ring at predetermined positions thereof and a fixed casing surrounding said elastic ring.

5. An elastic guide for the suspension shaft of the bowl of a cream separator comprising in combination at least two elements of a hard material in contact with said shaft and forming a lining therefor, an elastic ring surrounding said lining and having a radial section in the form of an M, the said elastic ring having a flexibility such that it may be deformed radially under the pressure of said elements of hard material when they are pushed back by centrifugal force which is exercised upon the rotation of said shaft in case of disequilibrium thereof, ribs inclined with relation to a radial plane interposed between the vertical arms of said M shaped ring at predetermined positions and a fixed casing encircling said elastic ring.

EDMOND LEON JEAN JADOUL.

REFERENCES CITED

The following references are of record in the file of this patent:

UNITED STATES PATENTS

| Number | Name | Date |
|---|---|---|
| 1,679,890 | Baldwin | Aug. 7, 1928 |
| 1,963,940 | Duffy | June 19, 1934 |
| 2,159,545 | Bartosch | May 23, 1939 |
| 2,187,359 | Miller | Jan. 16, 1940 |
| 2,228,632 | Landis | Jan. 14, 1941 |

FOREIGN PATENTS

| Number | Country | Date |
|---|---|---|
| 50,022 | Sweden | Oct. 14, 1918 |
| 54,165 | Sweden | Aug. 19, 1921 |
| 197,740 | Germany | Apr. 23, 1908 |